United States Patent [19]
Pitt

[11] Patent Number: 5,323,254
[45] Date of Patent: Jun. 21, 1994

[54] DISPLAY DEVICE WITH ELECTROSTATIC DISCHARGE PROTECTION

[75] Inventor: Michael G. Pitt, Eindhoven, Netherlands

[73] Assignee: U.S. Philips Corporation, New York, N.Y.

[21] Appl. No.: 29,811

[22] Filed: Mar. 11, 1993

[30] Foreign Application Priority Data

Apr. 3, 1992 [EP] European Pat. Off. ......... 92200952.7

[51] Int. Cl.[5] .................................................. G02F 1/136
[52] U.S. Cl. ........................................ 359/60; 359/54; 359/87; 359/88
[58] Field of Search ................. 359/54, 58, 59, 87, 359/88, 80; 245/91, 93; 257/356

[56] References Cited

U.S. PATENT DOCUMENTS

| | | | |
|---|---|---|---|
| 4,811,006 | 3/1989 | Kuijk | 245/91 |
| 4,994,796 | 2/1991 | Kuijk | 359/60 |
| 5,032,831 | 7/1991 | Kuijk | 359/60 |
| 5,184,235 | 2/1993 | Sukegawa | 359/60 |
| 5,212,573 | 5/1993 | Yamazaki | 359/58 |

*Primary Examiner*—William L. Sikes
*Assistant Examiner*—Tai W. Duong
*Attorney, Agent, or Firm*—John C. Fox

[57] ABSTRACT

In a display device of the reset type, damage of switching elements such as diodes (9, 19) due to electrostatic discharge is prevented by arranging a switching unit (14) between column electrodes (8) and lines (18) for a reference voltage. The switching unit (14) comprises, for example a series arrangement of diodes (13) which is arranged anti-parallel to the diodes (9, 19) between column electrodes and the reference line. Further measures for preventing electrostatic discharge between row electrodes (7, 11) and column electrodes (8) are described.

14 Claims, 4 Drawing Sheets

DISPLAY DEVICE WITH ELECTROSTATIC DISCHARGE PROTECTION

BACKGROUND OF THE INVENTION

The invention relates to a display device comprising an electro-optical display medium between two supporting plates, a system of pixels arranged in rows and columns, with each pixel being formed by picture electrodes arranged on the facing surfaces of the supporting plates, and a system of row and column electrodes for presenting selection and data signals, a picture electrode on one of the supporting plates being connected in an electrically conducting manner to a first non-linear asymmetric two-pole switching unit between a column electrode for data signals and the picture electrode and to a second non-linear asymmetric two-pole switching unit between the picture electrode and an electrode for a reference voltage.

A display device of this type is suitable for displaying video information and alpha-numerical information by means of passive electro-optical display media such as liquid crystals, electrophoretic suspensions and electrochromic materials.

In this Application a non-linear asymmetric two-pole switching unit is understood to mean a switching unit with a current-voltage behaviour which is asymmetrical with respect to the I axis in the current-voltage (I–V) characteristic and in which the current depends non-linearly on the applied voltage such as, for example, a diode. Such a switching unit may comprise a single switching element such as, for example, a diode or a combination of such switching elements which are arranged in series or parallel for reasons of, for example, redundancy.

A display device of the type mentioned in the opening paragraph is described in U.S. Pat. No. 5,032,831. In a device shown in this document diodes are used as switching elements. Juxtaposed columns of pixels are connected via these diodes to an electrode for a reference voltage and to drive electrodes (column electrodes) which are arranged between columns of picture electrodes. The reference voltage is used for applying, prior to selection, an auxiliary voltage across the pixel beyond or on the edge of the range of voltages to be used for picture display.

It is known that electrostatic charging may take place during the manufacture of the supporting plates on which the switching elements are provided (the active plates). A voltage difference may then occur between different column electrodes, such that there is breakdown between these column electrodes, while the switching elements or other components are damaged, and also the conducting tracks constituting the column electrodes may be damaged or may even melt.

Electrostatic breakdown may also occur between the row electrodes on the other supporting plate (the passive plate).

In a further stage of manufacture, when the active plates and passive plates have been joined and (at a still later stage) liquid crystal material or another electro-optical medium is present between the active and the passive plate, breakdown between a row and a column may also occur due to excessively high electrostatic voltages by which the switching element or a component of a pixel may be damaged. For example, degradation of the liquid crystalline material may also occur.

As the manufacture of the display device progresses, damage and consequently rejects due to electrostatic discharge will involve extremely high costs.

OBJECTS AND SUMMARY OF THE INVENTION

It is, inter alia an object of the present invention to provide a display device of the type described in the opening paragraph in which damage due to electrostatic discharge is prevented as much as possible.

To this end a display device according to the invention is characterized in that at least a first type of extra switching unit is arranged between the column electrode and the electrode for the reference voltage. For the extra switching unit a non-linear asymmetric two-pole switching unit is preferably also used, which unit is then arranged anti-parallel to the series arrangement of the first and the second non-linear asymmetric two-pole switching unit. Possibly excessive voltages between the column electrode and the electrode for the reference voltage are now prevented in that the extra switching unit will conduct (in the one direction) while excessive voltages of an opposite sign are prevented in that the series arrangement of the first and second switching units will conduct.

A preferred embodiment of a display device according to the invention is characterized in that at least a second type of extra switching unit is arranged on the supporting plate between points which are connected in an electrically conducting manner to parts of the row electrodes. The electric conductance may be realised, for example by means of an edge of anisotropically conducting material between the first and the second supporting plate. Too high voltages due to electrostatic charging between row electrodes are prevented via conductance by the second type of extra switching units. If desired, the edge of anisotropically conducting material (material conducting in a direction perpendicular to the supporting plates but not conducting in a direction in the plane of one of the supporting plates) may function as a sealing edge.

To prevent damage due to electrostatic charging between row electrodes and column electrodes (or the electrodes for the reference voltage), at least a third type of extra switching unit may be arranged on the first supporting plate between at least a row electrode and at least a column electrode (or an electrode for the reference voltage).

BRIEF DESCRIPTION OF THE DRAWING

These and other aspects of the invention will be apparent from and elucidated with reference to the embodiments described hereinafter. In the drawings FIG. 4 is a plan view of a part of the device of FIG. 2 at the area of a sealing edge, while

DESCRIPTION OF THE PREFERRED EMBODIMENT

Figure 1:
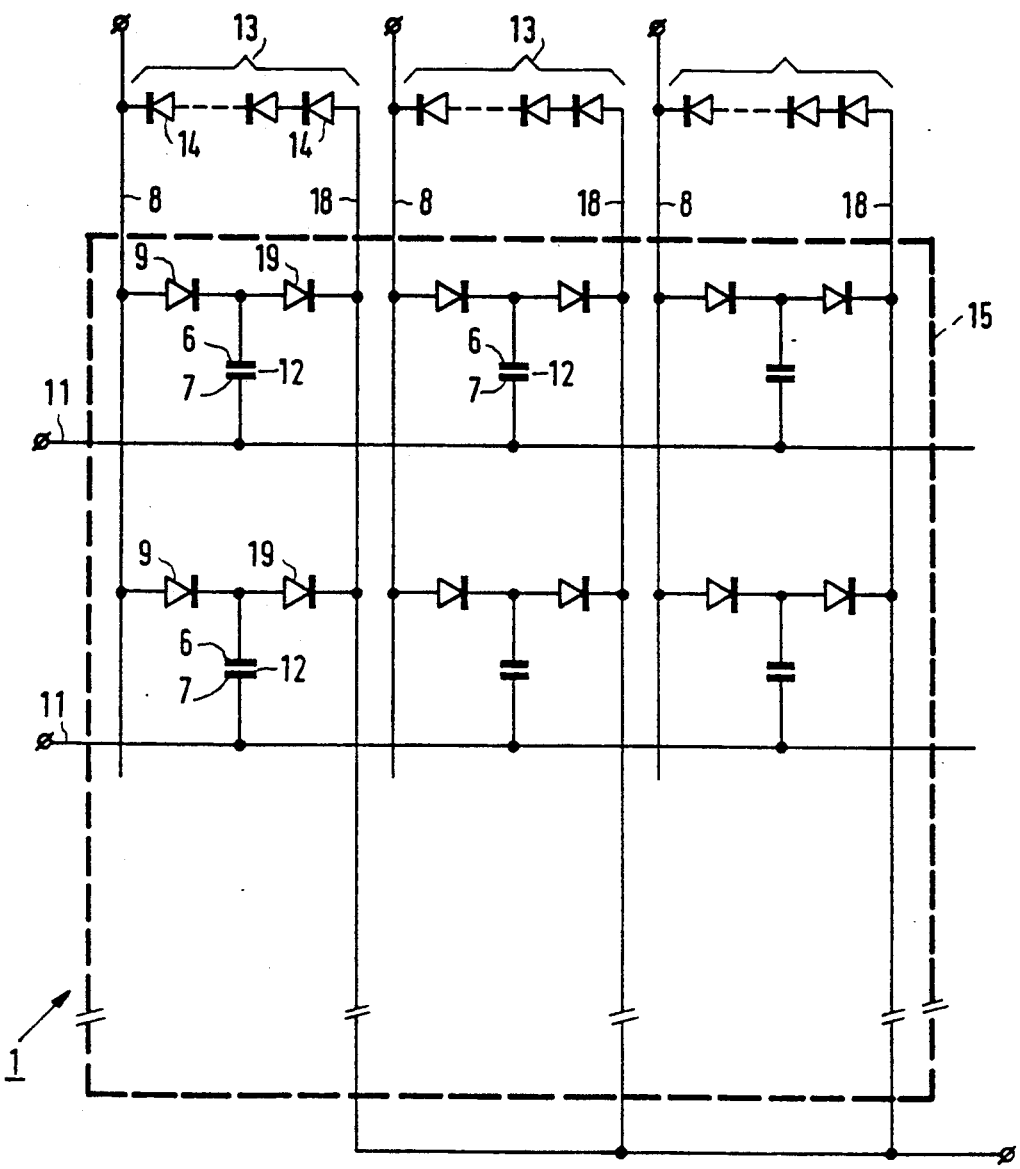
FIG. 1 is a diagrammatic representation of a device according to the invention.

FIG. 1 shows diagrammatically a display device 1 with pixels 12 formed by facing picture electrodes 6, 7. The pixels 12 are connected via the picture electrodes 7 to row electrodes 11 which together with the column electrodes 8 are arranged in the form of a matrix. The pixels 12 are connected to the column electrodes 8 via switching units comprising diodes 9. Simultaneously they are connected via switching units comprising diodes 19 to an auxiliary electrode 18 for a reference voltage. For a description of the operation of such a device reference is made to U.S. Pat. No. 5,032,831 whose contents are herein incorporated by reference.

Figure 2:
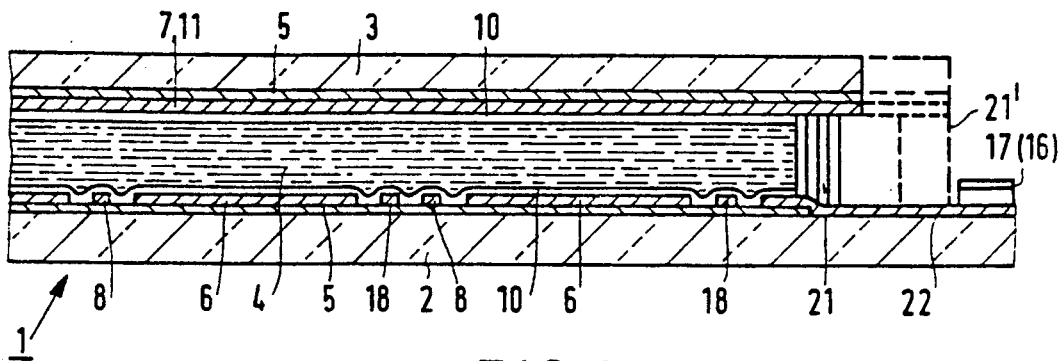
FIG. 2 is a diagrammatic cross-sectional view of such a display device.

FIG. 2 is a diagrammatic cross-section of a part of a display device according to the invention. This device is a liquid crystal display device 1 (FIG. 2) comprising two supporting plates 2 and 3 between which, for example a twisted nematic liquid crystalline material 4 is present. If necessary, the inner surfaces of the supporting plates 2, 3 comprise chemically and electrically insulating layers 5. The supporting plate 2 is provided with a number of row and column-arranged picture electrodes 6 of indium-tin oxide or another electrically conducting transparent material. Similarly, the other supporting plate 3 is provided with transparent picture electrodes 7 of, for example indium-tin oxide which are integrated to form strip-shaped row electrodes 11. The facing picture electrodes 6, 7 constitute the pixels 12 of the display device. The inner surfaces of the supporting plates 2, 3 are further provided with liquid crystal orienting layers 10. As is known, a different orientation of the liquid crystal molecules and hence an optically different state can be obtained by applying a voltage across the liquid crystal layer 4. The display device may be realised as a transmissive or a reflective device and may have one or two polarizers. The diodes 9, 19 which connect the picture electrodes 6 to the column electrodes 8 and the electrodes 18 for the reference voltage are not shown in the cross-section of FIG. 2.

According to the invention the display device comprises a first type of switching unit 13 (FIG. 1) on the first supporting plate, which unit consists of a series arrangement of a plurality of diodes 14 in this embodiment. The switching units 13 are arranged between an auxiliary electrode 18 and a column electrode 8, while the diodes 13 are anti-parallel to the diodes 8, 18 between the same electrodes in this embodiment. The switching units 13 may be realised both within and outside the sealing edge of the liquid crystal surface (diagrammatically denoted by means of the broken line 15). If a column electrode acquires a too high positive voltage due to electrostatic charging with respect to the auxiliary electrode 18, the diodes 8, 18 will start conducting so that the maximum voltage between this column electrode and the auxiliary electrode remains limited to the sum of the forward voltages of the diodes 9 and 19. If the voltage at the column electrode becomes too negative with respect to the auxiliary electrode, the voltage is limited to the forward voltage of the series arrangement of diodes 14.

During use, the switching unit 13 should of course not start conducting. The number of diodes 14 is therefore minimally n, where n. $V_{off} < |V_{colmin} - V_{ref}|$, in which $V_{off}$: voltage at which the forward current of the diode is substantially negligible.

$V_{colmin}$: minimum voltage across the column electrode. $V_{ref}$: voltage across the auxiliary electrode.

In a typical embodiment of a display device as described $|V_{colmin} - V_{ref}| \leq 10$ Volts. For the diodes used it holds that the current is less than 1 nA at V = 0.6 Volt ($V_{off}$). This means that approximately 17 diodes 14 are sufficient in such a device.

FIG. 1 also shows that a series arrangement of diodes 9, 19, 13 can always be found between two column electrodes 8 (via the common branch of the auxiliary electrode) so that the risk of electrostatic damage between two column electrodes is obviated.

In this embodiment the switching unit 13 comprises diodes 14 because such diodes already occur in the device, but this is not necessary; instead of diodes other non-linear elements such as, for example MIMs or non-linear resistors may alternatively be used, provided that the switching unit composed thereof does not conduct during operation and starts conducting at a sufficiently low voltage so as to prevent damage due to electrostatic discharge.

Figure 3:
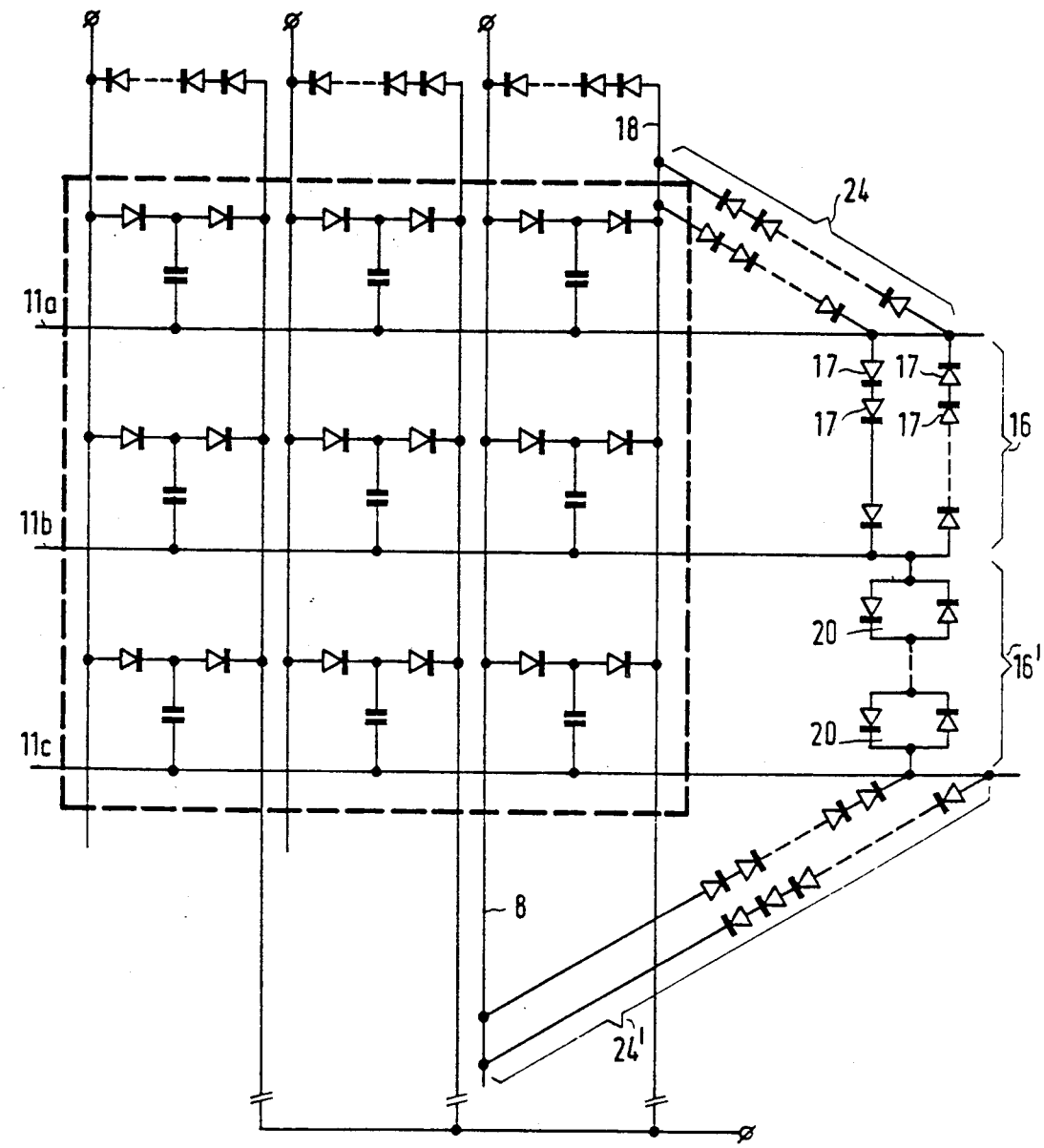
FIG. 3 is a diagrammatic representation of another display device according to the invention.

FIG. 3 shows a device in which a second type of extra switching units 16 is also present between the row electrodes 11. These switching units prevent the voltage from becoming too high due to electrostatic charging between different row electrodes 11. In this case the switching unit has a substantially symmetrical current-voltage characteristic and comprises, for example two branches of diodes 17 (switching unit 16) or series of diode rings 20 (switching unit 16'). The use of one or more non-linear resistors or MIMs is alternatively possible.

For reasons of manufacture it is advantageous to manufacture the switching units 16 by means of the same technology as that which is used for manufacturing the switching elements driving the picture electrodes, in this case the diodes 9, 19, because the extra switching units 16 can then be realised simultaneously with the switching elements (diodes) on the supporting plate 2. To contact the row conductors 7, 11 with the switching units 16, they are connected via an anisotropically conducting edge 21 to a metallization track 22 on the substrate 2 which in its turn contacts a diode 17 of a switching unit 16. The edge 21 may simultaneously function as a sealing edge or it may be provided separately (21').

Figure 4:
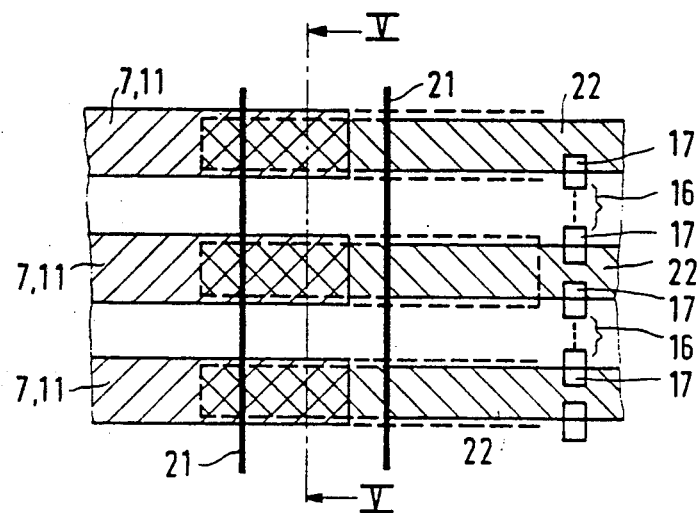
Figure 5:
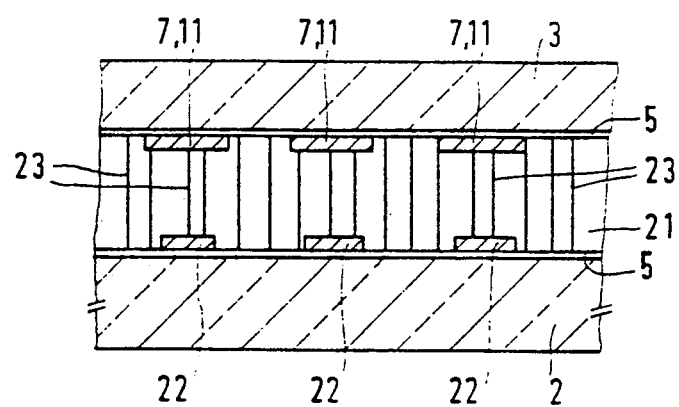
FIG. 5 is a cross-section taken on the line V—V in FIG. 4

FIGS. 4 and 5 show a possible manner of connection in a plan view and in a cross-section, respectively. Here, the sealing edge 21 consists of anisotropically conducting material, for example a synthetic material layer with elastic pellets dispersed therein, which may be, for example gold-plated, or metal pellets. The anisotropic way of conductance is shown in FIG. 5 by means of conducting tracks 23. These tracks 23 connect the metallization tracks 22, which extend below the edge 21, to row electrodes 7 provided on the supporting plate 3, which electrodes in their turn extend far enough above the edge 21 to ensure electrically conducting contact via the tracks 23.

The device of FIG. 3 also comprises a third type of extra switching units 24, 24' (via the tracks 23 and the metallization patterns 22) between the row electrodes $11^a$, $11^c$ and an electrode 18 for the reference voltage and a column electrode 8, respectively. In this way damage of switching elements or of the liquid crystal device due to discharge between a row electrode 11 and an electrode 18 for the reference voltage or between row and column electrode is prevented from occurring in a semimanufactured product in which the two supporting plates 2, 3 are combined via the edge 21 and also in the finished product. The switching units 24 also have a substantially symmetrical current-voltage characteristic.

Figure 6:
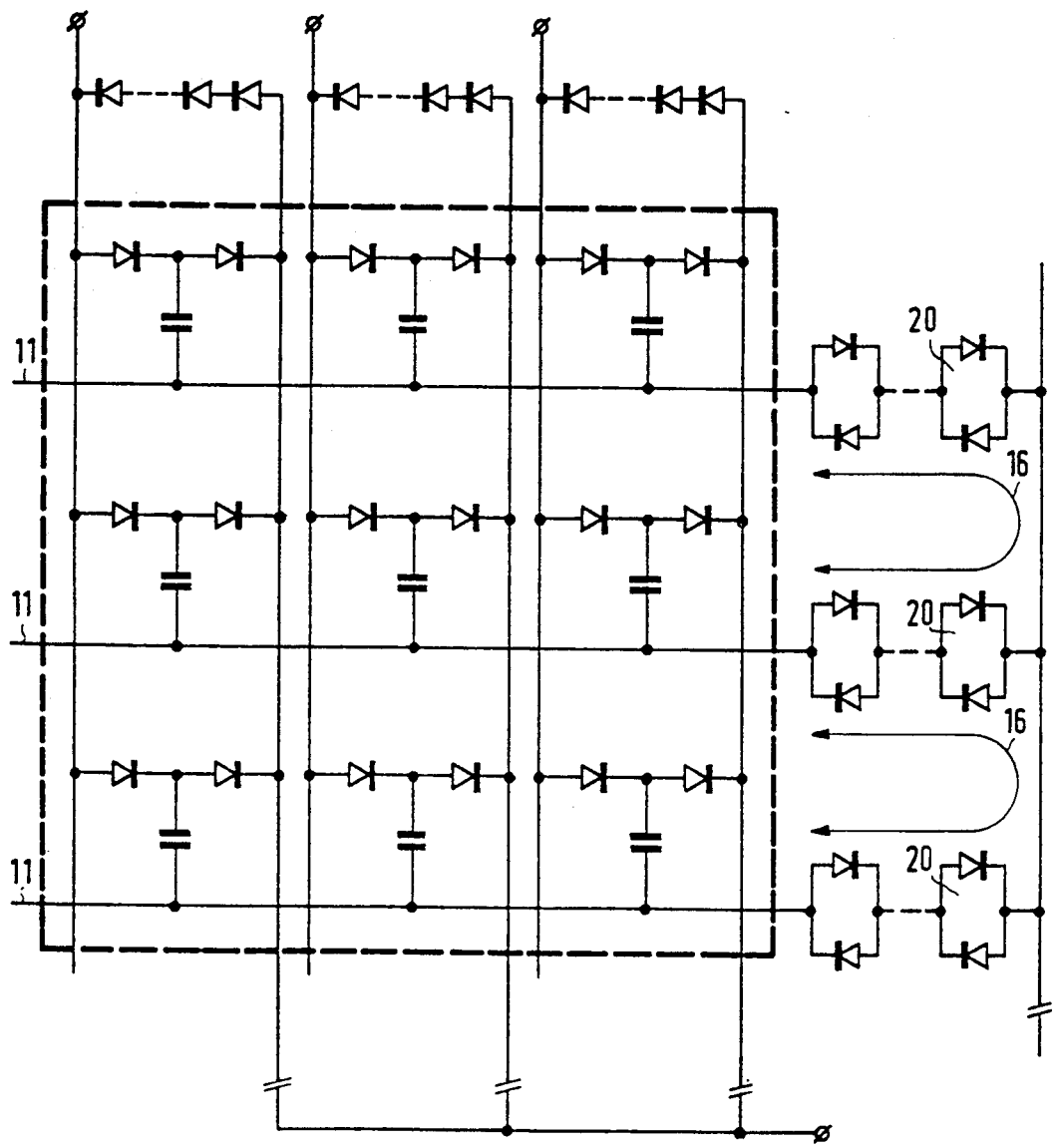
FIG. 6 shows a modification of FIG. 3

FIG. 6 shows a modification of FIG. 3 in which different switching units 16 have switching elements (in this embodiment diode rings 20) in common between the row electrodes 11.

The invention is of course not limited to the embodiments shown, but several variations are possible within the scope of the invention. For example, non-linear switching elements other than diodes are alternatively possible such as, for example bipolar transistors with short-circuited base-collector junctions. There are also various possible types of diodes. In addition to the diodes which are conventionally used in the technology for display devices, for example a Schottky diode, a pin diode formed in monocrystalline, polycrystalline silicon or another suitable semiconductor material may be used, while the diodes may be formed both vertically and laterally. The extra switching units 13 need not necessarily be realised outside the area denoted by the broken line 15. The same applies to the switching units 16 and 24. Instead of the edge 21 of anisotropically conducting material, other connections between the row electrodes 11 and the metallization patterns 22, such as bumps, may alternatively be used.

I claim:

1. A display device comprising an electro-optical display medium between two supporting plates, a system of pixels arranged in rows and columns, with each pixel being formed by picture electrodes arranged on the facing surfaces of the supporting plates, and a system of row and column electrodes for presenting selection and data signals, a picture electrode on one of the supporting plates being connected in an electrically conducting manner to a first non-linear asymmetric two-pole switching unit between a column electrode for data signals and the picture electrode and to a second non-linear asymmetric two-pole switching unit between the picture electrode and an electrode for a reference voltage, characterized in that at least a first type of extra switching unit is connected between the column electrode and the electrode for the reference voltage.

2. A display device as claimed in claim 1, characterized in that the extra switching unit comprises a non-linear asymmetric two-pole switching unit which is connected anti-parallel to the series arrangement of the first and the second non-linear asymmetric two-pole switching unit.

3. A display device as claimed in claim 1, characterized in that at least a second type of extra switching unit is arranged on the supporting plate and connected between points which are connected in an electrically conducting manner to parts of the row electrodes.

4. A display device as claimed in claim 1, characterized in that at least a third type of extra switching unit is arranged on the supporting plate and connected between the point which is connected in an electrically conducting manner to a row electrode and a column electrode.

5. A display device as claimed in claim 1, characterized in that at least a third type of extra switching unit is arranged on the supporting plate and connected between the point which is connected in an electrically conducting manner to a row electrode and an electrode for the reference voltage.

6. A display device as claimed in claim 3, characterized in that the device has an anisotropically conducting edge for the electric conductance.

7. A display device as claimed in claim 6, characterized in that the anisotropically electrically conducting edge also functions as a sealing edge of the device.

8. A display device as claimed in claim 2, characterized in that at least a second type of extra switching unit is arranged on the supporting plate and connected between points which are connected in an electrically conducting manner to parts of the row electrodes.

9. A display device as claimed in claim 2, characterized in that at least a third type of extra switching unit is arranged on the supporting plate and connected between the point which is connected in an electrically conducting manner to a row electrode and a column electrode.

10. A display device as claimed in claim 3, characterized in that at least a third type of extra switching unit is arranged on the supporting plate and connected between the point which is connected in an electrically conducting manner to a row electrode and a column electrode.

11. A display device as claimed in claim 2, characterized in that at least a third type of extra switching unit is arranged on the supporting plate and connected between the point which is connected in an electrically conducting manner to a row electrode and an electrode for the reference voltage.

12. A display device as claimed in claim 3, characterized in that at least a third type of extra switching unit is arranged on the supporting plate and connected between the point which is connected in an electrically conducting manner to a row electrode and an electrode for the reference voltage.

13. A display device as claimed in claim 4, characterized in that the device has an anisotropically conducting edge for the electric conductance.

14. A display device as claimed in claim 5, characterized in that the device has an anisotropically conducting edge for the electric conductance.

* * * * *